MAGNETIC SYSTEMS

Filed May 1, 1957 6 Sheets-Sheet 1

INVENTORS.
George R. Briggs & Arthur W. Lo
BY Morris L. Rabkin
ATTORNEY.

INVENTORS.
George R. Brigg &
Arthur W. Lo
BY Morris L. Rabkin
ATTORNEY.

INVENTORS.
George R. Briggs &
Arthur W. Lo
BY Morris L. Rabkin
ATTORNEY.

INVENTORS.
George R. Briggs &
Arthur W. Lo
BY Morris L. Rabkin
ATTORNEY.

INVENTORS.
George R. Briggs &
Arthur W. Lo
BY Morris [signature]
ATTORNEY.

INVENTORS.
George R. Briggs &
Arthur W. Lo
BY
Morris L. Rabkin
ATTORNEY.

2,911,628

MAGNETIC SYSTEMS

George R. Briggs, Princeton, and Arthur W. Lo, Fords, N.J., assignors to Radio Corporation of America, a corporation of Delaware Application May 1, 1957, Serial No. 656,028
16 Claims. (Cl. 340—174)

This invention relates to magnetic systems of the shift register type.

An article by A. J. Rajchman and A. W. Lo, entitled "The Transfluxor," and published in the March 1956 issue of the Proceedings of the I.R.E., at pages 321–332, describes the construction and the operation of transfluxor devices. A transfluxor includes a core of rectangular hysteresis loop magnetic material having two or more apertures, and may be arranged to provide almost complete electrical isolation between various windings linked to the transfluxor core. Because of the electrical isolation between various windings, shift register type circuits using transfluxors can be provided which use relatively simple transfer loops between the various register stages and which are efficient in operation.

Another property of a transfluxor device that can be used to advantage in shift register type circuits is the non-destructive readout which can be obtained from a transfluxor core. That is, the pattern of information stored in a shift register can be repeatedly ascertained without changing the stored pattern.

It is, therefore, an object of the present invention to provide improved circuits of the shift register type.

Another object of the present invention is to provide improved shift register type circuits in which relatively simple transfer loops can be used for coupling the various register stages.

Still another object of the present invention is to provide improved circuits of the shift register type, wherein non-destructive read-out of the stored information is provided.

According to the invention, a plurality of transfluxor devices are connected in cascade by a plurality of transfer circuits each coupling one transfluxor to a succeeding transfluxor. One or more priming lines link the transfluxors, and first and second shift lines link alternate ones of the transfluxors. Information signals are successively shifted to succeeding transfluxors by alternately applying shift signals to the first and second shift lines. Each shift signal is preceded by a priming signal. The priming signals serve two main purposes: first, to decouple the transfluxors to prevent information flow in undesired directions; and, second, to improve the efficiency of operation.

Various embodiments of the invention are described. In certain embodiments two shift lines and a single priming line are used. In some embodiments, two shift lines and two priming lines are used. In some embodiments, an additional aperture is provided in each transfluxor device to obtain non-destructive read-out of the stored information.

In the accompanying drawings, in which like reference numerals are used to designate like elements:

Fig. 1 is a schematic diagram of a shift register circuit according to the invention;

Figs. 2 through 5, respectively, are diagrams of a transfluxor core of Fig. 1 respectively illustrating the flux patterns in that transfluxor core for different portions of the operating cycle of the circuit of Fig. 1;

Figure 7:
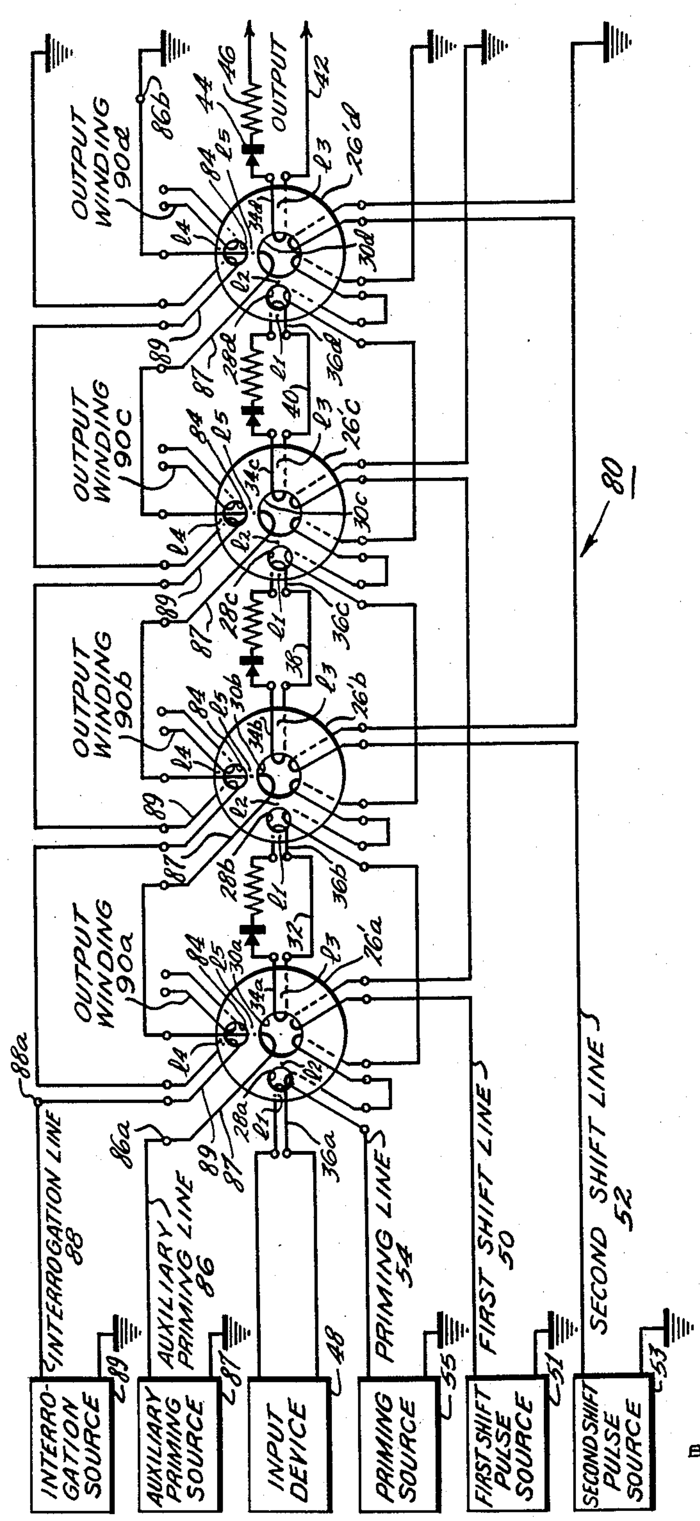
Fig. 7 is a schematic diagram of another embodiment of a circuit according to the invention, which provides a non-destructive read-out of the stored information.
Figure 14:
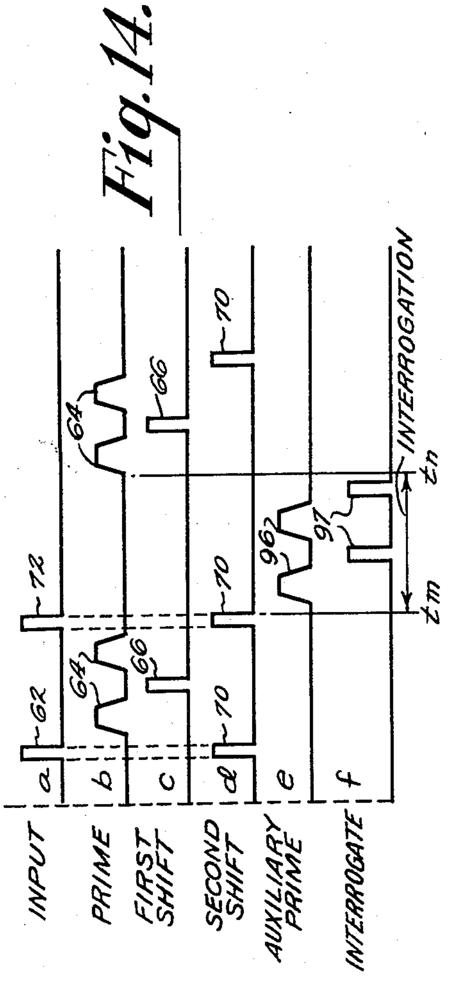
Figure 15:
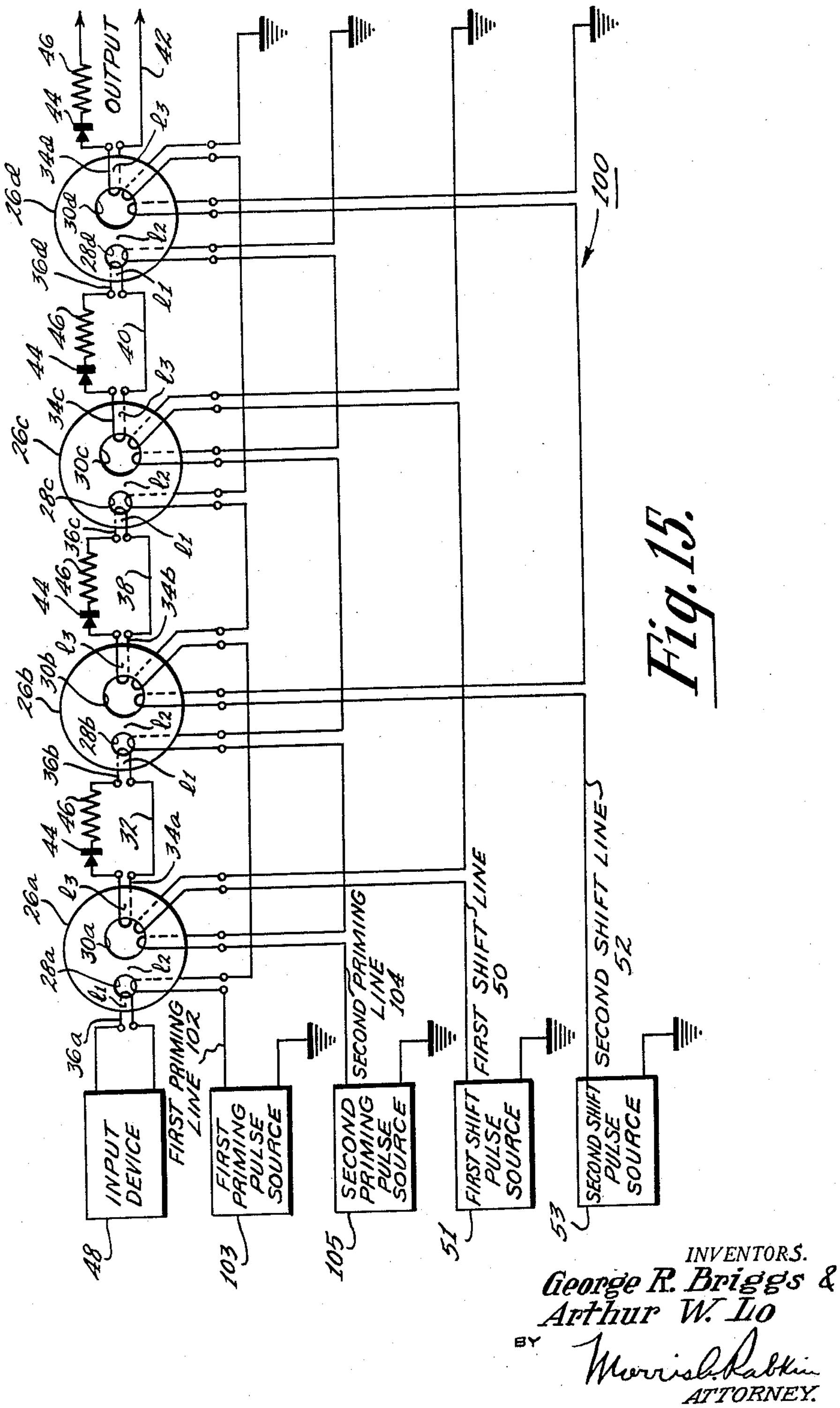
Figure 16:
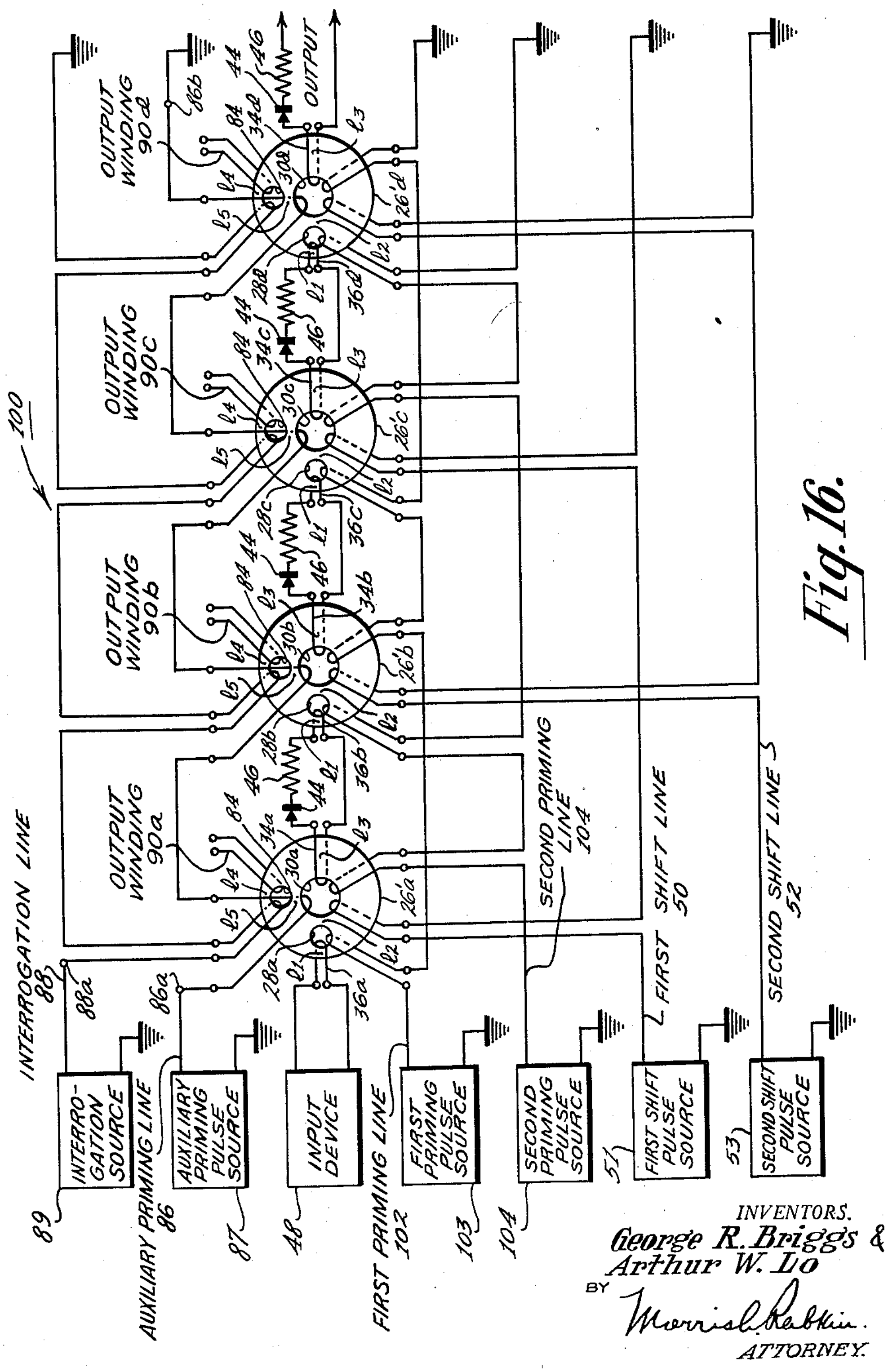

Figs. 8 through 13, respectively, are schematic diagrams respectively illustrating the flux patterns in one of the transfluxor cores of Fig. 7 for different portions of the operating cycle;

Fig. 14 is a timing diagram useful in explaining the operation of the circuit of Fig. 7;

Fig. 15 is a schematic diagram of another embodiment of the invention, using a pair of drive lines and a pair of priming lines; and Fig. 16 is a schematic diagram of a circuit according to the invention, using a pair of shift lines and a pair of priming lines, and providing a non-destructive read-out of the stored information.

Figure 1:
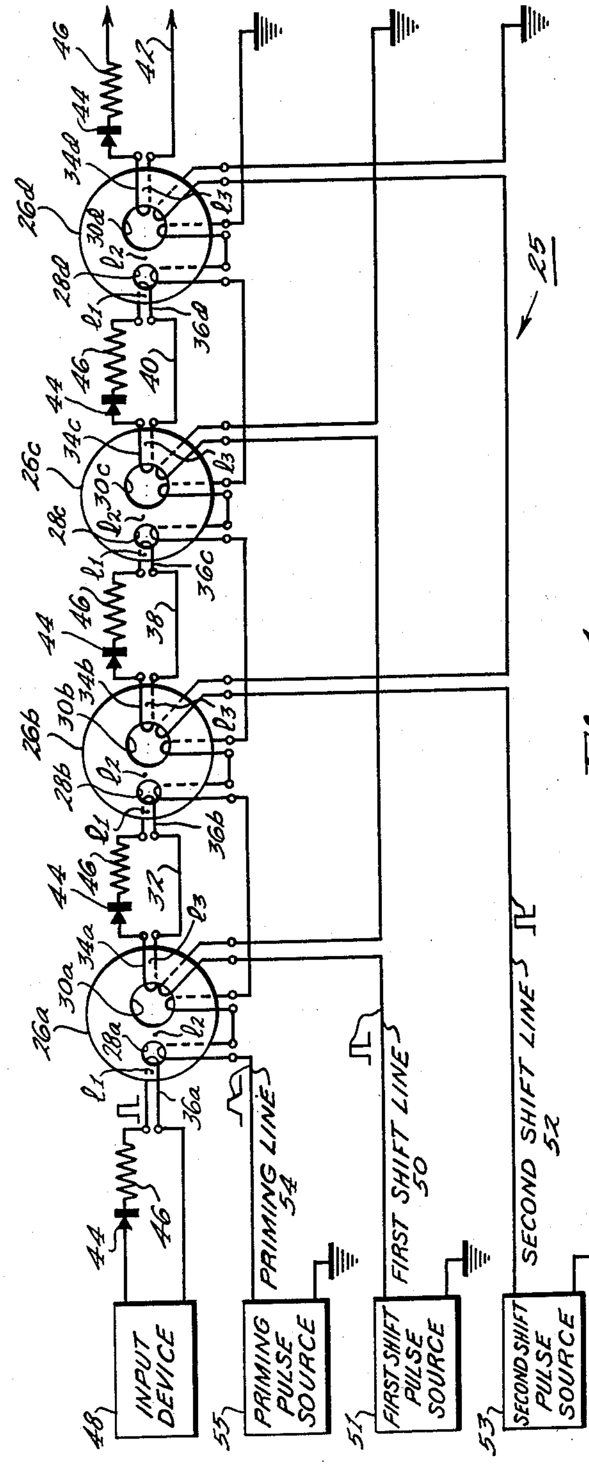
Figure 3:
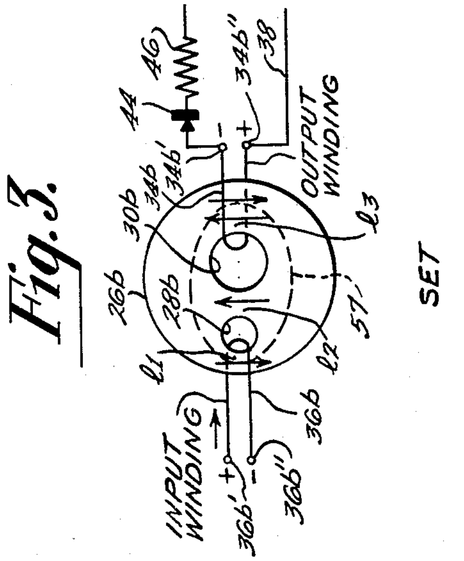

The shift register 25 of Fig. 1, illustratively, has four transfluxors, each similar to the transfluxor of Fig. 3 of the above-mentioned Rajchman and Lo article. Each of the transfluxor cores 26, individually designated **26*a*, 26*b*, 26*c* and 26*d*, is provided with two apertures, smaller diameter, setting apertures 28*a*, 28*b*, 28*c* and 28*d*, respectively, and larger diameter, output apertures 30*a*, 30*b*, 30*c* and 30*d*, respectively. The two apertures 28 and 30 in a core 26 provide three legs $l_1$, $l_2$ and $l_3$. The narrow legs $l_1$ and $l_2$ adjacent the setting aperture 28 have substantially equal transverse cross-sectional areas. The wide leg $l_3$ adjacent the output aperture 30** has a transverse cross-sectional area at least equal to the sum of the cross-sectional areas of the narrow legs $l_1$ and $l_2$.

Three transfer loops 32, 38 and 40, respectively, couple the first pair of cores **26*a*, 26*b*, the second pair of cores 26*b*, 26*c*, and the third pair of cores 26*c*, 26*d*. The fourth core 26*d* may be paired in similar fashion to another core (not shown) by means of a transfer loop 42**.

Each of the transfer loops 32, 38, 40 and 42 is similar to the other, and each includes a separate unidirectional conducting element, such as a crystal diode 44, connected in series with a resistance element 46 between the output winding 34 of one core 26 and the input winding 36 of a succeeding core 26. The diodes 44 are each poled for easy direction of current flow (conventional) in the clockwise sense (as viewed in the drawing) in a transfer loop. The input winding **36*a* of the first core 26*a* is connected to a source of input pulses, such as an input device 48. A first shift line 50 is threaded through the output apertures 30*a* and 30*c* of the cores 26*a* and 26*c* and is connected to a first source 51 of shift pulses. A second shift line 52 is threaded through the output apertures 30*b* and 30*c* of the cores 26*b* and 26*d*, and is connected to a second source 53 of shift pulses. A priming line 54 is threaded through both setting and output apertures 28*a* to 28*d*, and 30*a* to 30*d*, of all the cores 26, and is connected to a source 55 of priming pulses. The senses of linkage of the various windings to the cores 26** are described more fully hereinafter. For convenience of drawing, the windings are each shown as single-turn windings. It is understood, however, that multi-turn windings may be used in suitable turns ratios.

Figure 2:
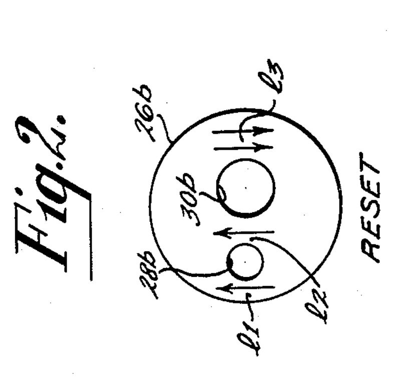

All the cores 26 respond similarly to like applied signals. Accordingly, only the operation of the second core **26*b* in the shift register 25 is described in detail. The flux pattern in the legs $l_1$, $l_2$ and $l_3$ of the core 26*b*, in its initial or reset state, is indicated in Fig. 2. In the reset state, the flux is oriented in the clockwise sense about the larger aperture 30*b*, as viewed in the drawing, in each of the legs $l_1$, $l_2$ and $l_3$. When a core 26** is in its reset condition, substantially no flux change is produced therein when positive polarity priming or shift signals are applied, because both the legs $l_1$ and $l_3$ already are saturated with flux in the sense in which these signals tend to increase flux.

The flux pattern in the core 26b in its set state is indicated in Fig. 3. The core 26b is placed in its set state by a transfer (or input) signal applied to the input winding 36b in a direction to produce a flux change in the legs $l_1$ and $l_3$ from the clockwise to the counterclockwise sense along a flux path indicated by the dotted line 57. The well-known right-hand rule can be used to ascertain the flux orientations in a core 26 as a result of an applied signal. The transfer signal may be generated by the preceding core 26a during the first shift operation. The upper terminal 36b' of the input winding 36b is made positive relative to its lower terminal 36b'' by the transfer signal. The resultant transfer current flows in an upward direction through the setting aperture 28b of the core 26b. No flux change occurs in the middle leg $l_2$ of the core 26b because the leg $l_2$ already is saturated with flux in the counterclockwise sense about the setting aperture 28b. The flux change in the wide leg $l_3$ produces a voltage across the terminals of the output winding 34b in a direction to make its upper terminal 34b' negative relative to its lower terminal 34b''. Accordingly, the voltage induced in the output winding 34b when the core 26b is changed to its set condition makes the diode 44 virtually non-conductive because the diode cathode is driven positive relative to the diode anode.

Figure 4:
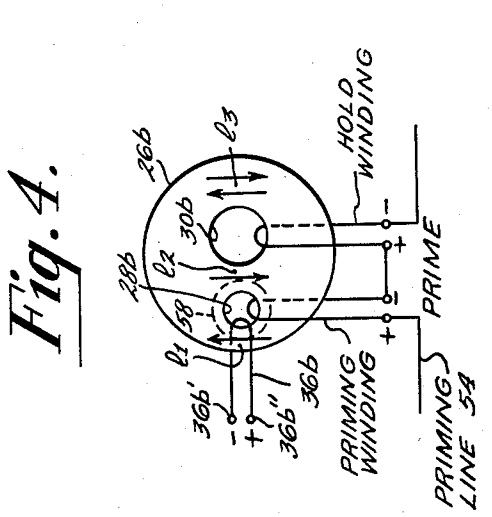

The flux pattern in the core 26b in its primed condition is indicated in Fig. 4. Application of a positive priming pulse to the priming line 54 by the priming source 55 produces a flux change in the narrow legs $l_1$ and $l_2$ from the counterclockwise to the clockwise sense along the flux path indicated by the dotted line 58. The priming pulse also is applied through the output aperture 30b of the core 26b and is used to hold the flux in the wide leg $l_3$ of the core 26b in its set state. The holding action of the priming pulses is discussed more fully hereinafter.

The flux change in the narrow leg $l_1$ of the core 26b, when the priming signal is applied, induces a voltage across the core 26b input winding 36b in a direction to make its upper terminal 36b' negative relative to its lower terminal 36b''. This induced voltage is in a direction to cause the diode 44 of the first transfer loop 32 to conduct, and a resultant transfer current flows in the first transfer loop 32 as described more fully hereinafter.

Figure 5:
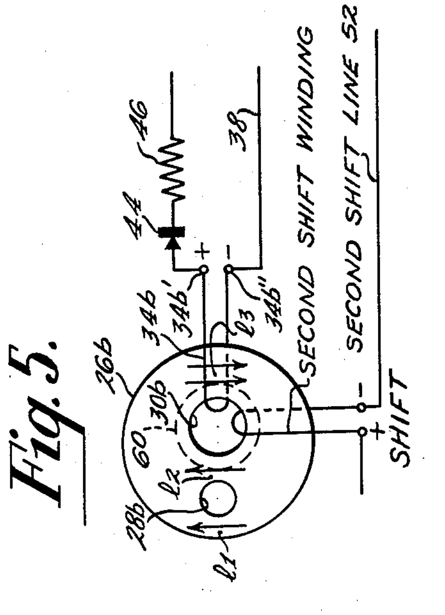

Fig. 5 indicates the flux pattern in the core 26b, after a positive shift pulse is applied to the second shift line 52 by the second shift source 53. The positive shift pulse produces a flux change in the legs $l_2$ and $l_3$ from the clockwise to the counterclockwise sense along the flux path indicated by the dotted line 60. The flux change in the wide leg $l_3$ induces a transfer voltage in the output winding 34b in a direction to make its upper terminal 34b' positive relative to its lower terminal 34b''. Accordingly, the transfer voltage causes the diode 44 of the second transfer loop 38 to conduct, and a transfer current flows in the second transfer loop 38. After the second shift signal is terminated, the core 26b is in its initial reset condition.

Referring again to Figure 1, assume that all the cores 26 of the shift register are in their reset conditions. Application of a positive input pulse from the input device 48 changes the first core 26a from its reset to its set condition. The positive input pulse is illustrated by the positive pulse 62 of line *a* of Fig. 6. The diode 44 of the first transfer loop 32 prevents any current flow during the setting of the first core 26a.

Figure 6:
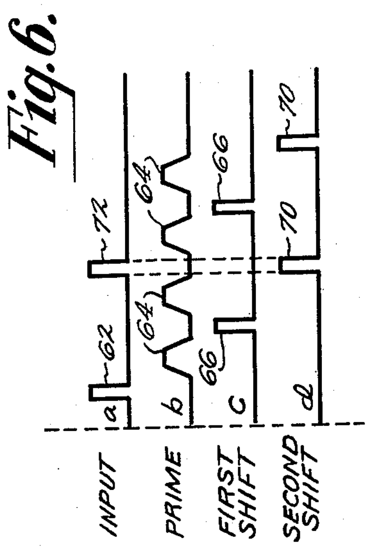
Fig. 6 is a timing diagram useful in explaining the operation of the circuit of Fig. 1.

A positive priming pulse, illustrated by the positive pulse 64 of line *b* of Fig. 6 is next applied to the priming line 54 to change the core 26a from its set to its primed condition.

Following the priming pulse 64, a positive shift pulse 66 of line *c*, Fig. 6, is applied to the first shift line 50 by the first shift source 51. The first shift pulse 66 changes the first core 26a from its primed to its reset condition, thereby inducing a transfer current in the first transfer loop 32 to change the second core 26b from its reset to its set condition.

A second positive priming pulse 64 of line *b*, Fig. 6, is applied by the priming pulse source 55 to the priming line 54. This second priming pulse changes the second core 26b from its set to its primed condition. The voltage induced in the input winding 36b of the core 26b by the second priming signal induces a current flow in the first transfer loop 32 in a direction to produce a flux change from the clockwise to the counterclockwise sense, about the output aperture 30a in the legs $l_2$ and $l_3$ of the reset core 26a. However, the priming source current applied at the same time through the output aperture 28a of the core 26a is in a direction to inhibit any flux change in the legs $l_2$ and $l_3$ of the core 26a by the current flow in the first transfer loop 32.

Note that the priming source current flowing through the output aperture 30b of the second core 26b is in a direction to hold the middle leg $l_2$ in the set direction, and is in a direction to produce a flux change along the longest path including the legs $l_1$ and $l_3$. The latter flux change is undesired and would result in improper operation of the shift register. The undesired flux change in a set core 26 is minimized in a number of ways. First, the amount of current produced in the first transfer loop 32, when the second core 26b is changed to its primed condition, is limited by carrying out the priming operation relatively slowly. The amplitude of the voltage induced in the first transfer loop 32, and hence the amount of current flow therein, is reduced by bringing up the leading edge of the priming source pulse relatively slowly. In practice, the priming operation is carried out ten or more times slower than a shift operation. Second, the path along which the undesired flux change occurs is lengthened by making the output aperture 30 of a core 26 of larger radial dimension than the setting aperture 28. Third, the holding magnetizing force applied during the priming operation opposes the magnetizing force generated by the first transfer loop current flow. Note that the amount of holding magnetizing force is made sufficiently small such that it does not produce any flux change in a set core either by itself or in connection with the magnetizing force applied by the priming winding of a set core 26. A smaller number of turns is used in linking the priming line 54 through the output apertures 30 than are used in linking the priming line 54 through the setting apertures 26 of the cores 26. Finally, the series-resistant element 46 in the first transfer loop 32 limits the amount of transfer current that can flow when the second core 26b is primed. Accordingly, a relatively small holding magnetizing force is sufficient to prevent any spurious flux changes in the first core 26a when the second core 26b is primed.

Application of a positive shift source pulse, illustrated by the positive pulse 70 of line *d* of Fig. 6 to the second shift line 52, changes the second core 26b from its primed to its reset condition. The voltage induced in the output winding 34b of the second core 26b induces a current in the second transfer loop 38 in a direction to change the third core 26c from its reset to its set condition.

Note that the shifting operation can be carried out as fast as desired because no undesired voltages are induced in the input windings 36 of the cores 26 which transfer information signals to succeeding cores 26. Also note that the shifting operation is relatively efficient because a series resistance of relatively small impedance can be used, and because the series resistance is used only to limit the undesired current flow during the priming operation which is carried out relatively slowly. Therefore, the major portion of the transfer voltage developed across the output winding **34*b* during the shift operation, as a result of the flux change in the set core 26*b*, is applied to the input winding 36*c* of the succeeding core 26*c*. That is, most of the flux change in the core 26*b* is transferred to the core 26*c***.

A new positive input pulse, illustrated by the positive pulse 72 of line *a* of Fig. 6, can be applied to the first core **26*a* by the input device 48 during the second shift operation. The new input pulse changes the first core 26*a* from its reset to its set condition. Application of a continuing sequence of priming, first drive, priming and second drive signals successively shifts the information to successive ones of the cores 26 in similar manner. The information originally inserted into the first core 26*a* appears in the transfer loop 42 of the last core 26*d* after a pair of first and second shift pulses are applied. A pair of the cores 26**, therefore, is used for storing each separate binary digit of information as in so-called two-core per bit shift register devices.

Figures 8, 9, 10, 11, 12, 13:
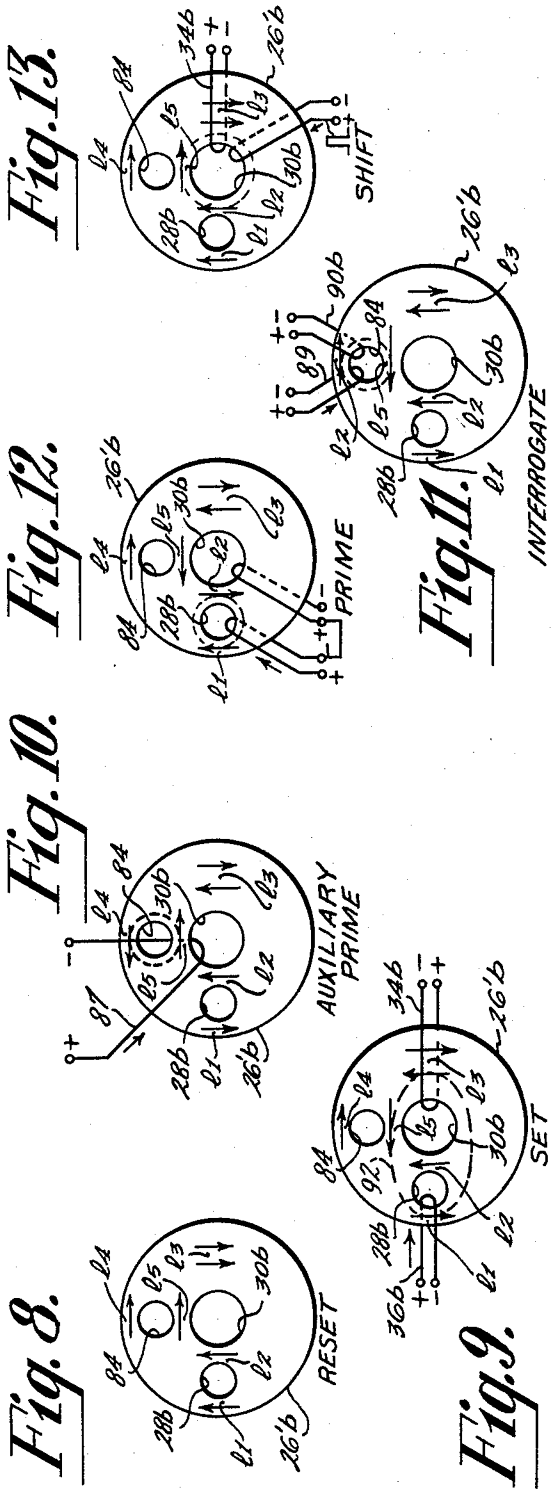

Non-destructive read-out of the pattern of the stored information can be obtained by employing the shift register circuit 80 of Fig. 7. The shift register 80 of Fig. 7 is arranged similarly to the shift register 25 of Fig. 1 except that each of the cores thereof is provided with a third aperture 84 used for interrogating the condition of that core. The cores 26′ of Fig. 7 are similar to the cores 26 of Fig. 1 except for the additional interrogation apertures 84. The interrogation aperture 84 of each of the cores 26′ provides two additional legs $l_4$ and $l_5$, each of equal cross-sectional area. An auxiliary priming line 86 is coupled to all the cores 26′ through both their output and interrogation apertures 30 and 84. Beginning at one terminal **86*a*, the auxiliary priming line 86, starting with the first core 26′*a*, is brought across the top surface of the core down through its output aperture 30, then along the bottom surface of the first core 26′*a* then upwardly through the interrogation aperture 84, and finally across the top surface of the first core 26′*a* to the second core 26′*b*, and so on, to the other end terminal 86*b*. An interrogation line 88 is linked to all the cores 26′ through their interrogation apertures 84. Separate output windings 90*a*, 90*b*, 90*c* and 90*d*, are linked to the cores 26′*a*, 26′*b*, 26′*c* and 26′*d*, respectively, through their interrogation apertures 84. The auxiliary priming line 86 is connected at the terminal 86*a* to a source 87 of auxiliary priming signals, and the interrogation line 88 is connected at the terminal 88*a* to a source 89 of interrogation signals. The auxiliary priming line 86 and the interrogation line 88 are each connected to ground at their end terminals 86*b* and 88*b*, respectively. The flux pattern in one of the cores, for example, the second core 26′*b*, in its reset condition is indicated in Fig. 8. In the reset condition, the flux is oriented in the clockwise sense about the output aperture 30 in all the legs $l_1$ through $l_5$. In the set condition, the flux is changed in the legs $l_1$, $l_3$ and $l_5$ from the clockwise to the counterclockwise sense along a flux path indicated by the dotted line 92 of Fig. 9. The flux pattern in the core 26′*b*, when it is changed from its set condition by an auxiliary priming pulse, is indicated in Fig. 10. A positive auxiliary priming source pulse applied by the auxiliary priming source 87 to the auxiliary priming line 86 produces a flux change in the legs $l_4$ and $l_5$ of a set core 26′ from the clockwise to the counterclockwise sense. Substantially no flux change is produced in the legs $l_4$ and $l_5$ of a reset core 26′ by the auxiliary priming signal because the inner leg $l_5$ already is saturated with flux in the clockwise sense about the output aperture 30**.

The flux pattern in the core **26′*b*, after the application of a positive interrogation source pulse by the interrogation source 89 to the interrogation line 88 is indicated in Fig. 11. The positive interrogation source pulse produces a flux change in the legs $l_4$ and $l_5$ of a core 26′ primed 26′, primed by the auxiliary priming currents from the counterclockwise to the clockwise sense about the interrogation aperture 84. Each time a flux change is produced in the legs $l_4$ and $l_5$ of a core 26′, a voltage is induced across its output winding 90. An indefinite number of auxiliary priming and interrogation pulses applied to a core 26′ provide an indefinite number of read-outs of the stored information. Thus, those of the cores 26′ that are storing binary "1" digits, for example, have relatively large voltages induced in their output windings 90 as a result of the changing flux in their legs $l_4$ and $l_5$. Those of the cores 26′ that are storing binary "0" digits do not have any appreciable voltages induced in their output windings 90**.

After each interrogation pulse is terminated, the flux in the legs $l_1$ through $l_5$, respectively, of a core 26′ is oriented in the same sense as when the core 26 is in its set condition, as shown in Fig. 9. Accordingly, application of a priming source signal to the priming line 54 changes the flux in the legs $l_1$ and $l_2$ of the set cores 26′ from the counterclockwise to the clockwise sense, about the setting apertures 28. A subsequent shift source signal applied to the shift line linked to the set cores 26′ resets these cores 26′ by changing the flux in their legs $l_2$, $l_3$, and $l_5$ from the counterclockwise to the clockwise sense about the output aperture 30, as indicated in Fig. 13.

Thus, referring again to Fig. 7, when all the cores 26′ are in the reset condition, a sequence of auxiliary priming signals applied to the auxiliary priming line 86 and interrogation signals applied to the interrogation line 88 does not produce any signals in the output windings 90. When one or more of the cores 26′ are in their set conditions, however, the sequence of auxiliary priming and interrogation pulses produces relatively large output signals in the output windings of the set cores 26′.

A timing diagram for the shift register 80 is shown in Fig. 14. The diagram of Fig. 14 is similar to the diagram of Fig. 6 except that, between the times *tm* and *tn*, the shift register 90 is interrogated. The positive input signals 62 and 72 of line *a* of Fig. 14 may be applied to the input winding **36*a* of the first core 26′*a* coincidentally with a second shift source signal 70** of line *d*, or at any time between the termination of a second shift source signal 70 and initiation of the next succeeding priming source signal 64 of line *b*. The priming signals 64 are respectively interlaced with each pair of a first and second shift source signals of lines *c* and *d*. The auxiliary priming source signals 96 and the interrogation source signals 97 are applied at any time between the termination of a second shift signal 70 and initiation of the succeeding priming source signal 64, as indicated in lines *e* and *f* of Fig. 14.

Fig. 15 shows another embodiment of the invention using a shift register 100 having a pair of priming lines 102 and 104. The remaining elements of the shift register 100 are arranged similarly to the shift register 25 of Fig. 1. The first priming line 102 links the first and third cores **26*a* and 26*c* through their setting apertures 28*a* and 28*c*, and links the second and fourth cores 26*b* and 26*d* through their output apertures 30*b* and 30*d*. The second priming line 104 links the first and third cores 26*a*, 26*c* through their output apertures 30*a* and 30*c*, and links the second and fourth cores 26*b* and 26*d* through their setting apertures 28*b* and 28*d*. First and second priming sources 103 and 105 are used for applying first and second priming signals to the first and second priming lines 102 and 104**, respectively.

By thus providing a pair of priming lines, the priming operation can be carried out at greater speed than in the arrangement of Fig. 1, and may be as fast as the shifting operations. Relatively intense priming source signals can be applied to the priming lines 102 and 104 because there is no tendency to produce spurious flux changes in the wide leg $l_3$ of a set core 26. For example, assume that the second core 26b is in its set condition. A positive priming source signal applied to the second priming winding 104 by the second priming source 105 produces a flux change in the path about the setting aperture 28b of the second core 26b. This flux change induces a current in the first transfer loop 32 in the clockwise sense. However, the second priming current also flows through the output aperture 30a of the first core 26a in a direction to inhibit the transfer current flowing in the first transfer loop 32 from producing a flux change in the wide leg $l_3$ of the first core 26a. The magnetizing force generated by the second priming signal 104, flowing through the output aperture 30a of the first core 26a, may be as large as desired because it is in a direction to maintain the flux in each of the legs $l_1$, $l_2$ and $l_3$ of the first core 26a in its reset direction. Similarly, the third core 26c is changed from its set to its primed condition by a priming source signal applied to the first priming line 102 by the first priming source 103. The first priming source current flowing through the output aperture 30b of the second core 26b prevents the transfer current flowing in the second transfer loop 38 from producing any undesired flux changes in the second core 26b.

Another embodiment of a shift register, according to the invention, for providing non-destructive read-out of the stored information, is shown in Fig. 16. The shift register 110 of Fig. 16 is arranged similarly to the shift register 80 of Fig. 7, except that a pair of priming lines 102 and 104 are used in the manner described for the shift register 100 of Fig. 15.

The operation of the shift register 110 is similar to the operation of the shift register 80 of Fig. 7, except that the priming signals applied to the priming windings 102 and 104 may be as large as desired without producing any undesired flux changes in the cores 26'.

In inoperation, the priming pulses shown in line *d* of the timing diagram of Fig. 14 are alternately applied to the first and second priming lines 102 and 104 of Fig. 16.

There have been described herein improved shift register type circuits using transfluxors. Each transfer loop between successive transfluxors includes a unidirectional conducting device and a series-connected resistance element. If desired, the series-connected resistance element of a transfer loop may be a non-linear, voltage-sensitive impedance element, such as a non-linear, resistance element made from cadmium-sulfide material. The resistive value of a voltage-sensitive element varies inversely with the amplitude of the applied voltage. Accordingly, during the shifting operations, when a relatively large voltage is induced across the transfer loops, the voltage-sensitive elements offer a relatively small impedance to the transfer current flow. However, during the priming operation using a single priming line, when a relatively small voltage is induced across the transfer loops, the voltage-sensitive elements offer a relatively high impedance to the transfer current flow. Accordingly, voltage-sensitive resistance elements further limit undesired transfer currents.

Continuously interrogable shift register circuits may be obtained, as shown in Figs. 7 and 16, by providing each transfluxor core with an additional interrogation aperture. Any suitable load device may be connected to the second output windings 90, such as indicating lamps, other magnetic cores, etc. The radial dimensions and shape of the various apertures may be arbitrary, so long as the cross-estional areas of the legs are maintained, as described above. Preferably, however, the output aperture is made of relatively larger radial dimensions than the input aperture to provide a longer flux path for undesired flux changes. If desired, other load devices (not shown) may be connected in series in the various transfer loops or connected across the various transfer loops.

What is claimed is:

1. A magnetic shift register comprising a plurality of transfluxors each having a core of rectangular hysteresis characteristic material having a first aperture and a second aperture, a plurality of transfer circuits connecting said transfluxors in a shifting sequence, each said transfer circuit coupling one of said transfluxors through its said first aperture to another succeeding transfluxor through the second aperture of said succeeding transfluxor, each said transfer circuit including a separate unidirectional conducting element and a separate resistance element connected in series with each other in said transfer circuit, a priming means linking all said transfluxors through their said first and second apertures, and shift means linking all said transfluxors through their said first apertures for shifting information signals from one of said transfluxors to a succeeding one of said transfluxors.

2. A magnetic shift register comprising a plurality of transfluxors each having first and second apertures, a plurality of transfer circuits connecting said transfluxors in cascade, one transfer circuit being linked through said first and second apertures of first and second of said transfluxors respectively, another transfer circuit being linked through said first and second apertures of said second and a third of said transfluxors respectively, and so on, each said transfer circuit including a unidirectional conducting element and a resistive element connected in series with each other in said transfer circuit, a priming means linking all said transfluxors through their said first and second apertures, and first and second shift lines alternately linking said transfluxors through their said first apertures.

3. A magnetic shift register comprising a plurality of transfluxors each having first and second apertures, a plurality of transfer circuits each including a unidirectional conducting device and a resistance element connected in series with each other, said transfer circuits connecting said transfluxors in cascade, one transfer circuit being linked through said first and second apertures of first and second of said transfluxors respectively, another transfer circuit being linked through said first and second apertures of said second and a third of said transfluxors respectively, and so on, shift means linking all said transfluxors through said first apertures, and a single priming line linking all said transfluxors through said first and said second apertures in each said transfluxor.

4. A magnetic shift register comprising a plurality of transfluxors each having apertures, and each having input and output windings linked through different said apertures, transfer circuits connecting said transfluxors in a shifting sequence, each said transfer circuit comprising a unidirectional conducting element connected in series with a resistive element between the output winding of one transfluxor and the input winding of a succeeding transfluxor, a priming means linking all said transfluxors through said different apertures, and shift means coupled to all said transfluxors through one of said different apertures for shifting an information signal from any one transfluxor to the transfluxor succeeding said one transfluxor.

5. A magnetic shift register comprising a plurality of transfluxors each having first, second and third apertures, a plurality of transfer circuits connecting said transfluxors in cascade, one transfer circuit being linked through said first and second apertures of first and second of said transfluxors respectively, another transfer circuit being linked through said first and second apertures of said second and a third of said transfluxors respectively, and so on, shift means linking all said transfluxors through said first apertures for shifting information signals from certain transfluxors to the transfluxors succeeding said certain transfluxors, a priming line linking all said transfluxors through said first and said third apertures of each said transfluxor, and an interrogation line linking all said transfluxors through said third apertures thereof.

6. A magnetic shift register comprising a plurality of transfluxors each having first and second apertures, a plurality of transfer circuits each including a unidirectional conducting device and a resistance element connected in series with each other, said transfer circuits connecting said transfluxors in cascade, one transfer circuit being linked through said first and second apertures of first and second of said transfluxors respectively, another transfer circuit being linked through said first and second apertures of said second and a third of said transfluxors respectively, and so on, a first shift means linking alternate ones of said transfluxors through said first apertures thereof, second shift means linking the other alternate ones of said transfluxors through said first apertures thereof, first priming means linking said alternate transfluxors through said second apertures thereof and linking said other alternate ones of said transfluxors through said first apertures thereof, and second priming means linking said alternate ones of said transfluxors through said first apertures thereof and linking said other alternate ones of said transfluxors through said second apertures thereof.

7. A magnetic shift register comprising a plurality of transfluxors each having first, second and third apertures, a plurality of transfer circuits connecting said transfluxors in cascade, one transfer circuit being linked through said first and second apertures of first and second of said transfluxors respectively, another transfer circuit being linked through said first and second apertures of said second and a third of said transfluxors respectively, and so on, first shift means linking alternate ones of said transfluxors through said first apertures thereof, second shift means linking the other alternate ones of said transfluxors through said first apertures thereof, first priming means linking said alternate ones of said transfluxors through said second apertures thereof and linking said other alternate ones of said transfluxors through said first apertures thereof, second priming means linking said alternate ones of said transfluxors through said first apertures thereof and linking said other alternate ones of said transfluxors through said second apertures thereof, a third priming means linking all said transfluxors through said first and said third apertures of each said transfluxor, and an interrogation line linking all said transfluxors through said third apertures thereof.

8. A magnetic shift register comprising a plurality of transfluxors each having first and second apertures, a plurality of transfer circuits connecting said transfluxors in cascade, one transfer circuit being linked through said first and second apertures of first and second of said transfluxors respectively, another transfer circuit being linked through said first and second apertures of said second and a third of said transfluxors respectively, and so on, each said transfer circuit including a unidirectional conducting element and a non-linear resistance element connected in series with each other in said transfer circuit, a priming means linking all said transfluxors through their said first and second apertures, and first and second shift lines alternately linking said transfluxors through their said first apertures.

9. A magnetic shift register comprising a plurality of transfluxors each having first and second apertures, a plurality of transfer circuits each including a unidirectional conducting device and a resistance element connected in series with each other, said transfer circuits connecting said transfluxors in cascade, one transfer circuit being linked through said first and second apertures of first and second of said transfluxors respectively, another transfer circuit being linked through said first and second apertures of said second and a third of said transfluxors respectively, and so on, shift means linking all said transfluxors through said first apertures, and a single priming line linking all said transfluxors through said first and said second apertures in each said transfluxor, said priming line linkage through said second apertures providing holding magnetizing forces.

10. A magnetic shift register comprising a plurality of transfluxors each having first and second apertures of different radial dimensions, a plurality of transfer circuits connecting said transfluxors in cascade, one transfer circuit being linked through said first and second apertures of first and second of said transfluxors respectively, another transfer circuit being linked through said first and second apertures of said second and a third of said transfluxors respectively, and so on, each said transfer circuit including a unidirectional conducting element and a resistive element connected in series with each other in said transfer circuit, a priming means linking all said transfluxors through their said first and second apertures, and first and second shift lines alternately linking said transfluxors through their said first apertures.

11. A magnetic shift register comprising a plurality of transfluxors each having first and second apertures, a plurality of transfer circuits each including a unidirectional conducting device and a resistance element connected in series with each other, said transfer circuits connecting said transfluxors in cascade, one transfer circuit being linked through said first and second apertures of first and second of said transfluxors respectively, another transfer circuit being linked through said first and second apertures of said second and a third of said transfluxors respectively, and so on, shift means linking all said transfluxors through said first apertures, a plurality of priming windings each linking a different one of said transfluxors through its said first aperture, a plurality of holding windings each linking a different one of said transfluxors through its said second aperture, and a priming line connecting said priming windings and said holding windings in series with each other.

12. A magnetic shift register comprising a plurality of transfluxors each having apertures, and each having input and output windings linked through different said apertures, transfer circuits connecting said transfluxors in a shifting sequence, each said transfer circuit comprising a unidirectional conducting element connected in series with a resistive element between the output winding of one transfluxor and the input winding of a succeeding transfluxor, a shift means linking all said transfluxors through said different apertures, and priming means coupled to all said transfluxors through one of said different apertures for decoupling said one transfluxor from said transfluxor preceding said one transfluxor.

13. A magnetic shift register as claimed in claim 12, said priming means including additional holding means coupled to all said transfluxors through the other of said different apertures.

14. A magnetic shift register comprising a plurality of transfluxors each having apertures of different radial dimensions, and each having input and output windings linked through different ones of said apertures, transfer circuits connecting said transfluxors in a shifting sequence, each said transfer circuit comprising a unidirectional conducting element connected in series with a non-linear, voltage-sensitive resistance element between the output winding of one transfluxor and the input winding of a succeeding transfluxor, a priming means linking all said transfluxors through said different apertures, and shift means coupled to all said transfluxors through one of said different apertures for shifting an information signal from any one transfluxor to the transfluxor succeeding said one transfluxor.

15. A magnetic shift register comprising a plurality of transfluxors each having first, second and third apertures, a plurality of transfer circuits connecting said transfluxors in cascade, one transfer circuit being linked through said first and second apertures of first and second of said transfluxors respectively, another transfer circuit being linked through said first and second apertures of said second and third of said transfluxors respectively, and so on, shift means linking all said transfluxors through said first apertures, priming means linking all said transfluxors through said first and second apertures, interrogation means linking all said transfluxors through said third apertures thereof, and a plurality of separate output windings, each linking a different one of said transfluxors through its said third aperture.

16. A magnetic shift register comprising a plurality of transfluxors each having first, second and third apertures, a plurality of transfer circuits connecting said transfluxors in cascade, one transfer circuit being linked through said first and second apertures of first and second of said transfluxors respectively, another transfer circuit being linked through said first and second apertures of said second and a third of said transfluxors respectively, and so on, shift means linking all said transfluxors through said first apertures for shifting information signals from certain transfluxors to the transfluxors succeeding said certain transfluxors, a priming line linking all said transfluxors through said first and said third apertures of each said transfluxor, and a plurality of separate output windings, each linking a different one of said transfluxors through its said third aperture.

References Cited in the file of this patent

UNITED STATES PATENTS

| | | |
|---|---|---|
| 2,802,953 | Arsenault et al. | Aug. 13, 1957 |
| 2,803,812 | Rajchman et al. | Aug. 20, 1957 |